FIG. 2.

Patented Jan. 14, 1947

2,414,108

UNITED STATES PATENT OFFICE

2,414,108

STABILIZED GUN CONTROL AND TRACKING SYSTEM

Richard C. Knowles, New York, Walter T. White, Hempstead, and Herbert Harris, Jr., Cedarhurst, N. Y., assignors to Sperry Gyroscope Company, Inc., Brooklyn, N. Y., a corporation of New York Application July 1, 1942, Serial No. 449,230

13 Claims. (Cl. 33—49)

The present system relates to stabilized radio-tracking or visual-tracking gun control systems, especially for use on ships or aircraft, and comprises an improvement on the systems disclosed and claimed in copending application Serial No. 444,152, for Stabilized tracking and fire control system, filed May 22, 1942, in the name of C. G. Holschuh, E. B. Hammond, Jr., and W. T. White, and also in copending application Serial No. 444,490, for Stabilized gun control system with aided tracking, filed May 25, 1942, in the name of R. C. Knowles, C. G. Holschuh and W. T. White, both of these applications being assigned to the same assignee as the present invention.

In these copending applications several forms of stabilized gun control systems are described in which the guns are controlled from a computing mechanism or computer adapted to have set thereinto data corresponding to the elevation, azimuth and range of a distant target, and data corresponding to the rate of change of target elevation and target azimuth. This data is derived from a sighting device which is preferably of the radio type, in which a radio scanner is either automatically or manually oriented toward the target, the orientation of the scanner thereby giving the target elevation and target azimuth data. Range data is derived either from an optical range device incorporated in the computer, which is preferably of the type disclosed and claimed in copending application Ser. No. 411,186, filed September 17, 1941, in the name of C. G. Holschuh and D. Fram, or from suitable radio circuits co-operating with the scanner, as shown and claimed in application Serial No. 441,188, for Radio gun control system, filed April 30, 1942, in the name of C. G. Holschuh, G. E. White, W. W. Mieher and J. E. Shepherd, these applications also being assigned to the same assignee as the present invention. The computer thereby derives the proper gun aiming angles, and controls the guns in accordance with these angles.

In copending applications 449,490 and 444,152, stabilization of the input orientation data and the required rate data are derived from a single free gyroscope mounted on the scanner or on the computer and carried thereby, which gyroscope is caused to maintain its spin axis oriented toward the target. The torque to maintain the spin axis toward the target is then proportional to the rate of change of orientation of the spin axis, and may be used to control the rate data inputs to the computer.

By the present invention the stabilizing gyro is mounted as a separate unit apart from both the computer and scanner in order to avoid the possibility of entirely disabling the system if the scanner alone is disabled, and provision is made whereby the computer may be selectively operated with the scanner alone, with the gyro alone, or with both or neither the gyro nor the scanner. In this' way the preferred operation with both gyro and scanner units is possible and if either the gyro or the scanner unit is disabled, the system may continue operating without them.

In order to avoid cascading of servos and follow-up systems, with the consequent summation of their respective unavoidable errors, the present system has been specially devised to eliminate the necessity for such cascading and to introduce stabilization derived from the gyro unit into the system in a novel manner.

Furthermore, to permit the computer to be controlled by a local manual control while tracking with the target by means of the built-in optical and range-finding system of the computer without connection to the gyro or scanner, should these latter units be unavailable or disabled, improved apparatus is provided to introduce the required rate data into the computer from the manual control and for providing aided tracking for the system, whereby operation of the device while getting on the target and while tracking with the target is greatly improved. In addition, aided tracking is utilized during the operation of the system including manual control of the radio scanner unit.

Accordingly, it is an object of the present invention to provide improved automatic gun control systems.

It is a further object of the present invention to provide improved radio-operated and gyro-stabilized gun control systems which are versatile in operation and which may be utilized selectively with radio tracking or visual tracking and with or without gyro-stabilization, in order to maintain effective use even should either or both the radio and gyro units be disabled.

It is a further object of the present invention to provide improved apparatus in a radio- or visually-operated gun control system for introducing stabilization therein to overcome the effect of variations in attitude of the craft, such as a ship or aircraft, upon which the apparatus is mounted.

It is a further object of the present invention to provide improved apparatus for producing aided tracking in a manual radio- or optically-operated gun control system.

It is a still further object of the present invention to provide improved apparatus for introducing rate data into a computing mechanism to be actuated thereby.

Other objects and advantages will become apparent from the appended specification and drawings, wherein.

Figure 1:
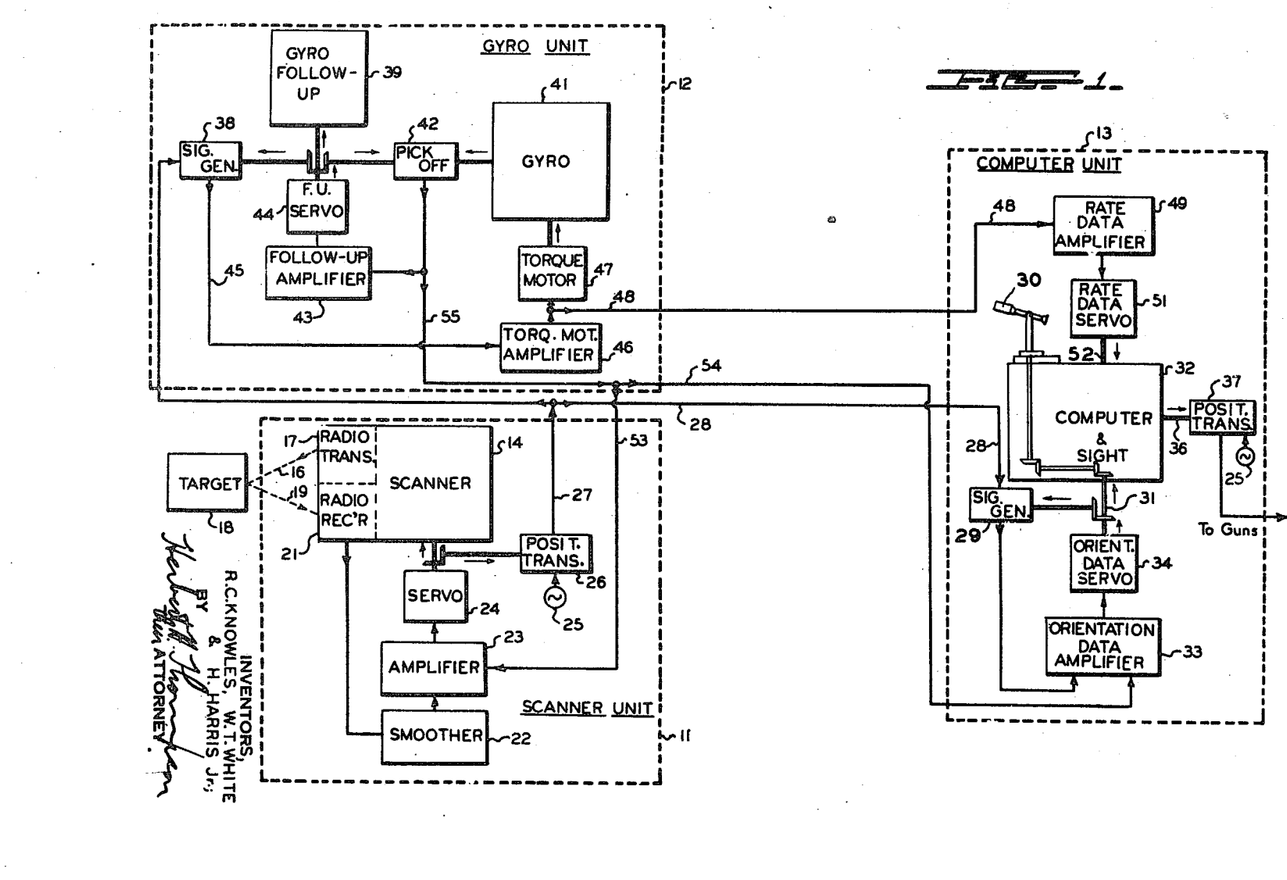
Fig. 1 shows a schematic block diagram of the present system during automatic radio-tracking and gyro-stabilized operation, showing control only along one coordinate of target motion.

Referring first to Fig. 1, there is shown therein a schematic block diagram of a single coordinate control for the system of the present invention during gyro-stabilized operation with automatic radio tracking. It is to be understood that the present system actually includes control along two coordinates of target motion, such as elevation and azimuth, each of which will be similar to the control shown in Fig. 1.

Thus, referring to Fig. 1, there are shown essentially three independent and preferably separated units, namely, the scanner unit 11, the gyro unit 12 and the computer unit 13. The scanner unit 11 comprises a scanner 14, which is described more in detail in the copending above-mentioned application 441,188. As therein shown, this scanner comprises a highly directive radiant energy system adapted to project a narrow radiant energy beam 16 comprising a recurring sequence of pulses of high frequency radiant energy, each pulse being of short duration. These pulses are derived from a suitable radio transmitter 17 also shown more in detail in copending application Ser. No. 441,188.

The projected beam 16 is rotated about a narrow cone, and the pulses therein will be reflected by any target, such as 18, in the field of this radiation. The reflected wave 19 is picked up by scanner 14 and supplied to a receiver 21, also shown in detail in application Ser. No. 441,188, which derives therefrom control signals corresponding to the orientation of the distant target along two coordinates, one of which signals is used in the system of Fig. 1.

As described in that copending application, the directivity pattern of an antenna connected to the receiver 19 is rotated about an axis to generate a cone. When the target is offset relative to this axis of rotation, the envelope of reflected pulses supplied from the antenna to the receiver 19 varies with each revolution of the antenna's pattern. By comparing the phase of this envelope of received pulses with a reference voltage, it is possible to determine the direction in which the target is offset relative to the axis of rotation.

Since it is generally desirable to resolve the displacement of the target from the axis of rotation of the antenna pattern into two components, the envelope of received energy may be compared with reference voltages supplied from separate windings of a two-phase generator. These two reference voltages are preferably displaced electrically by ninety degrees to obtain azimuth and elevation components of the target displacement. Signals corresponding to these azimuth and elevation components of the target displacement may readily be obtained by supplying the reference voltages and the envelope of received pulses to balanced modulator circuits which produce output signals corresponding to the phase relation of the input signals. In this manner a control signal is produced corresponding to the orientation of the target along two coordinates.

Since this control signal may be subject to fluctuations or random variations because of the constantly changing position of the target and scanner, and because of possible atmospheric or thermal noise effects, it first is passed through a smoother 22 to provide a smooth control voltage which actuates amplifier 23 controlling a servo device 24, which in turn acts to automatically reposition the scanner into correspondence with the target orientation, whereby the orientation of the scanner as defined by the axis of the conical scanning of the beam, remains coincident with the orientation of the distant target 18. Servo 24 is preferably of the type which produces an output speed proportional to the input signal, as shown in application 441,188.

Also actuated from servo 24 and scanner 14 is a conventional electrical position transmitter 26, such as of the "Selsyn" type, which thereby, in a well-known manner, produces signals in its output cable 27 corresponding to the orientation of target 18 along the particular coordinate whose control system is shown in Fig. 1, which may be either elevation or azimuth, for example.

Cable 27 is connected to the input 28 of a corresponding type signal transformer or signal generator 29, whose rotor is rotated in accordance with the orientation data input shaft 31 of computer 32, which is preferably of the type shown in copending application Serial No. 411,186. Signal generator 29 thus produces a signal corresponding to the relative error or displacement between the setting of the data input shaft 31 of computer 32 and the orientation of target 18. This signal is led to an amplifier 33 which actuates a servo 34 and thereby repositions the data input shaft 31 into correspondence with the target orientation. Servo 34 is of the conventional type in which its output is actuated so long as a signal input is supplied, whereby the output position corresponds to the position of the scanner transmitter 26. In this manner, the computer is continuously and automatically supplied with the target orientation data along one coordinate which it requires to produce, in its output 36, the proper data corresponding to the desired gun aiming angles, one of which is thereby transmitted to the remote guns by means of a suitable type electrical position transmitter 37, as is described in any or all of the above-mentioned applications.

Figure 2:
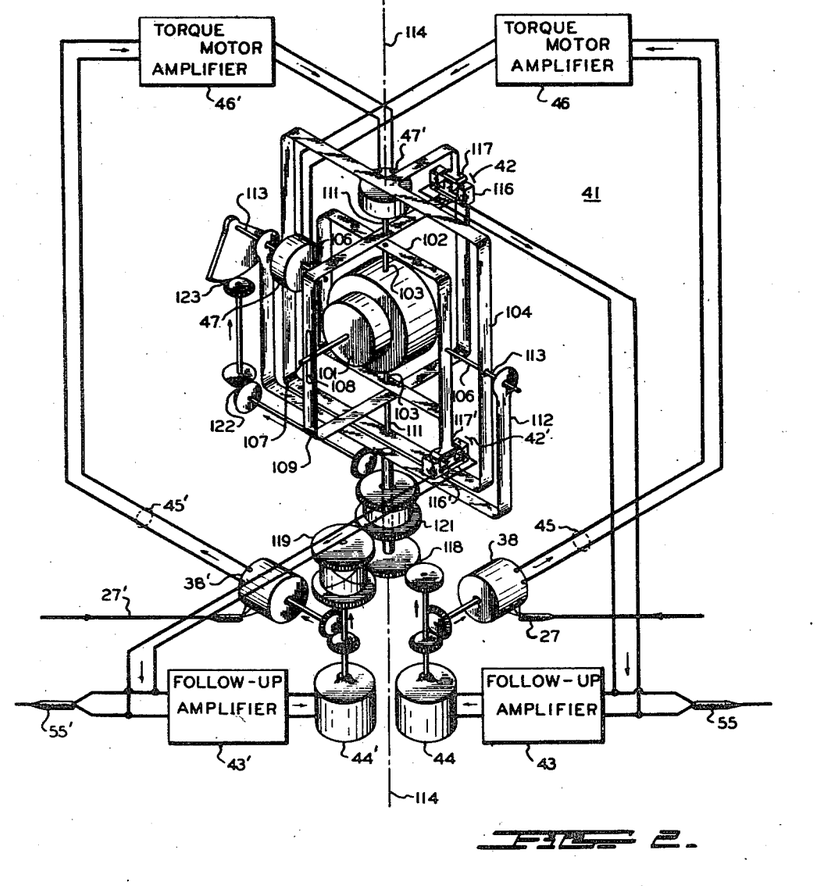
Fig. 2 shows a schematic perspective view of the gyro unit of the present device.

At the same time, output 27 of the scanner orientation transmitter 26 is connected to a further signal generator 38, whose rotor is actuated by the orientation of a gyro follow-up member 39, which is shown more in detail in Fig. 2.

Thus, in Fig. 2 the gyro unit 12 of the invention is shown as comprising a gyro rotor housed within a gyro rotor bearing frame or housing 101 and spun by suitable means, not shown. Gyro housing 101 is pivotally supported within a first gimbal ring 102 about trunnions 103, and ring 102 is in turn pivotally mounted within a follow-up ring 104 (corresponding to member 39 of Fig.

1) by means of normally horizontal trunnions 106 perpendicular to trunnions 103. Fastened to the gyro rotor housing 101 and coaxial with the spin axis thereof is a rod or arm 107 which is engaged in a slot 108 within a second gimbal ring 109, which is also pivotally mounted on follow-up ring 104 by means of trunnions 111 perpendicular to trunnions 106.

The follow-up ring 104, in turn, is pivotally mounted within a supporting bracket 112 about trunnions 113 coincident with the axis of trunnions 106, and bracket 112 is pivotally mounted on the craft carrying the device about axis 114 in a manner not shown. Fastened to follow-up ring 104 are a pair of torque-producing devices 47 and 47'. These torque-producing devices 47 and 47' may be of any type adapted to produce an output torque proportional to the voltage input thereto, and are preferably of the so-called torque-motor type. Torque motor 47' is adapted to produce a torque on ring 109 about the axis of trunnions 111, which torque is then transmitted and applied to the gyro rotor housing 101 about the axis of trunnions 103 by means of the rod and slot arrangement 107—108, thereby producing precession of the gyro about the axis of trunnions 106. Torque motor 47 is adapted to produce a torque on ring 102 about the axis of trunnions 106 thereof, which torque is directly transmitted to the gyro rotor housing 101 by means of its trunnions 103, thereby producing precession about the axis of trunnions 103.

Interposed between follow-up ring 104 and gimbal ring 109 is a pick-off device 42, which may be of any suitable type producing an electrical signal output corresponding in sense and magnitude to the sense and magnitude of relative displacement between follow-up ring 104 and ring 109 about the axis of trunnions 111.

In the present instance, this pick-off 42 is illustrated as being of the inductive E-transformer type, having a three-legged or E-shaped core 116, each leg of which bears a winding, the winding of the center leg being energized from a suitable source of alternating current (not shown) and the windings of the outer legs being connected in series opposition to the output circuit. Core 116 is carried by ring 109 and cooperates with a magnetic armature 117 carried by follow-up ring 104. When armature 117 is centralized with respect to core 116, equal and opposite voltages will be induced in the outer coils of the pick-off 42, and the resultant output voltage is zero. Should armature 117 vary in either sense from this central position, one of the outer coils will have induced therein a greater voltage than the other, and the output voltage will then be a reversible-phase voltage corresponding in phase to the sense of this relative displacement and in magnitude to the amount of the displacement.

A corresponding pick-off 42' has its armature fixed to ring 102 and its core 116' fixed to follow-up ring 104, and is thereby adapted to produce a signal corresponding to the relative displacement of follow-up ring 104 and gimbal ring 102 about the axis of trunnions 106.

The supporting bracket 112 is adapted to be rotated about its axis 114 by means of a servo-motor 44 suitably geared thereto by means of gearing 118, thereby rotating follow-up ring 104 about axis 114. Follow-up ring 104 is also adapted to be rotated about the axis of trunnions 113, which is perpendicular to the axis 114, by means of a servo-motor 44' suitably geared to trunnions 113 by means of a compensating differential 119, a floating gear 121, gearing 122 and a gear sector 123. As is well known, differential 119 is required to compensate for the effect of rotation of ring 104 about axis 114 upon its rotation about axis 113.

Motors 44 and 44' are actuated in accordance with the signals derived by respective pick-offs 42 and 42' connected thereto through respective amplifiers 43 and 43'. Also actuated simultaneously with the rotation of follow-up ring 104 about axes 114 and 113, are respective signal generators 38 and 38' whose outputs 45 and 45' actuate the respective torque motors 47 and 47' through respective torque motor amplifiers 43 and 43'.

In operation, referring to the system of Fig. 1 and considering for the moment only displacement about axis 114, which may be considered to be the azimuth axis of the device, it will be seen that if the azimuthal position of follow-up ring 104 (indicated in Fig. 1 as the gyro support 39) differs from that of the scanner 14 of Fig. 1, whose position transmitter 23 is connected as by lead 27 to a signal generator 38 which may be of any suitable type such as a "Selsyn" or "Telegon" adapted to produce a signal corresponding to the displacement between the positions of the scanner 14 and the follow-up ring 104. This signal is amplified in amplifier 46 and produces a corresponding torque in torque motor 47.

This amplified torque is applied about the axis of trunnions 106 to the gyro housing 101, and thereby produces a precession of the spin axis of the gyro 41 about an axis perpendicular to the torque axis, that is, about the axis of trunnions 103. This precession moves gimbal ring 109 relative to follow-up ring 104, by means of the slot and arm arrangement 107—108, whereby a signal is produced by pick-off 42, which is amplified by amplifier 43 to rotate motor 44.

Motor 44 will continue to rotate until the rotor of the signal generator 38 is repositioned to the position where zero signal is produced thereby, and until pick-off 42 is once more centralized to stop the rotation of motor 44. When this condition obtains, follow-up ring 104 will have been rotated through an angle corresponding to its former relative displacement with respect to scanner 14 and will be once more in correspondence with scanner 14. In this manner the spin axis of the gyro 41, which is normally perpendicular to the plane of the follow-up ring 104, is maintained coincident with the axis of rotation of scanner 14 and is thus directed toward the target.

Similar action, of course, takes place about the axis of trunnions 113, which may be considered to be the elevation axis of the gyro 41, when co-operating with a system similar to Fig. 1 controlling the other (elevation) axis of the apparatus.

As seen above, torque motor 47 serves to produce a torque which precesses the gyro spin axis in a direction to cause the gyro follow-up 39 controlled from the gyro spin axis to reduce the signal produced by the signal generator 38. In this manner, gyro 41 has its spin axis maintained toward the target under the control of the scanner 14. If the target is moving relative to the scanner, the gyro 41 will be continuously precessed to follow the orientation of the target. The torque required for this precession will be proportional to the angular velocity of the gyro spin axis and accordingly will be proportional to the angular velocity of the target orientation.

By providing a torque motor or other torque-producing device 47 that produces a torque having a substantially linear relation to the signal input, the signal input to the torque motor 47 derived from amplifier 46 will also be proportional to the target angular rate, since the gyro precesses at a rate proportional to the torque applied. For example, the torque applied by the torque motor 47 may be proportional to the current in the windings of the motor. If this current is controlled by the signal from amplifier 46, it will be evident that the gyro precesses at a rate corresponding to that signal. This signal is then connected by lead 48 to an amplifier 49 actuating a rate data servo 51 to control the rate data input 52 to computer 32 in accordance with the actual target angular rate.

In this way, computer 32 is supplied with target orientation data and target rate data. The range data for computer 32 may be supplied in any of the various manners shown in copending application Ser. No. 441,188.

As thus far described, the data input to computer 32 is in no sense stabilized, that is, such data may be rendered inaccurate by rapid fluctuations in the attitude of the craft carrying the present invention, which is adapted for use on ships or on aircraft. Thus, if a change in attitude of the craft occurs too rapidly for the scanner 14 to respond accurately thereto because of the delay inherent in the smoother 22, necessitated by the character of the radio-operated control system for scanner 14, the orientation of the scanner 14 will deviate from that of target 18, at least momentarily. However, it is this orientation which controls the rest of the system, and accordingly the input to the computer and thereby the orientation of the guns controlled thereby will be in error.

In order to prevent this action, gyro 41 is also used to provide a stabilizing correction for such changes in the attitude of the craft. Gyro 41, being a free gyro, tends to maintain its orientation fixed in space independently of the motion of the craft. Accordingly, if the craft changes its attitude, the gyro 41 will instantaneously deviate from its follow-up 39, which is, of course, carried by the craft, this deviation persisting until the gyro follow-up servo 44 can come into action to restore the follow-up 39 into correspondence with the gyro 41. During this interval of deviation, a signal will be produced in gyro pick-off 42 for the purpose of moving the follow-up back into correspondence with gyro 41. This signal, therefore, is an approximate measure of the fluctuations of the craft, and is therefore connected by way of lead 53 to the input of amplifier 23 to be superposed upon the signal derived from smoother 22, so as to additionally actuate the scanner 14 to correct for any delay in the automatic control of the scanner 14 from receiver 21 and smoother 22.

Amplifier 23 and servo 24 are preferably made to be quick-acting so that the scanner 14 will at once respond to the correction signal derived from lead 53, and will thereby overcome the inherent delay or lag in the radio-controlled part of the system. Preferably the follow-up circuit for gyro 41, comprising pick-off 42, amplifier 43, servo 44 and follow-up member 39, is made to have substantially the same rapidity of response as the scanner servo system. In this way, in response to a change in craft attitude, both the follow-up member 39 and the scanner 14 are restored to their proper positions relative to the gyro 41 and target 18, respectively, at substantially the same rate, so that the signal output from signal generator 38 will not change during this action. Should this condition not obtain exactly, then preferably the response of the gyro servo system 46, 47, 41 is made slower than those of the follow-up system 42, 43, 44, 39 or of the scanner servo system 23, 24, 14, so that any change in output from generator 38 will not have a chance to disturb the system before stabilized equilibrium is again attained. In this manner, scanner 14 will be maintained pointed properly toward the target and can therefore properly control computer 32. However, computer 32 is also subject to a small error due to possible lag in the operation of its servo 34 and the control therefor. Accordingly, the pick-off signal derived from pick-off 42 during these variations in attitude of the craft is also fed by way of lead 54 to the input to amplifier 33 to be superposed upon the voltage derived from signal generator 29, and to thereby provide a correction effect for controlling the computer 32 accurately in accordance with the target orientation even during variations in attitude of the craft. It will be clear that in this manner any inherent lag in the servo systems used may be compensated for.

It will be noted that the signal produced in pick-off 42 will be dependent upon the rapidity in variation of the attitude of the craft, since, for small variations in attitude, the gyro follow-up 39 can easily follow-up the position of gyro 41 producing very small, if any, signal in pick-off 42. However, this is no disadvantage, since, during such slow variations in the attitude of the craft, the scanner servo 24 can also operate satisfactorily to maintain the scanner 14 oriented toward the target even despite such slow variations, so that no correction is then necessary.

During fast variations in attitude, however, where the scanner servo 24 and the gyro follow-up servo 44 would be too slow to respond, substantial signal will be produced by pick-off 42, which will serve to give a "boost" to servo 24 to overcome the lag in the radio-controlled system for this servo 24, and also to actuate computer 32 to overcome any lag in its control from the scanner 14.

Figure 3:
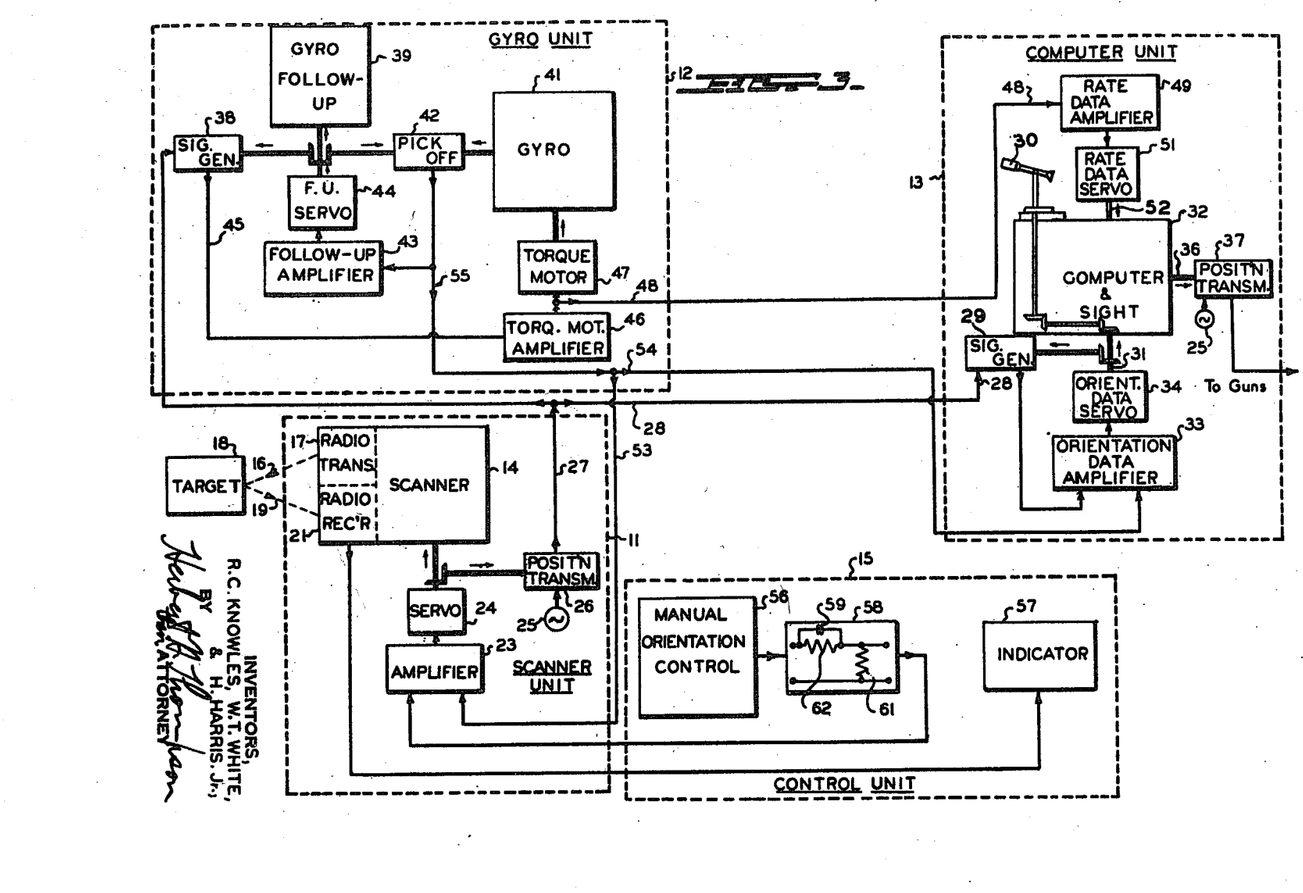
Fig. 3 shows a schematic block diagram similar to Fig. 1 but showing manually-controlled radio-tracking and gyro-stabilized operation.

Referring now to Fig. 3, there is shown a further block diagram similar to that of Fig. 1, also applied only to a single coordinate of the system. It will be understood that the present control system will be essentially duplicated to provide similar control for the other coordinate of the system. The system of Fig. 3 is essentially similar to that of Fig. 1, with the exception that the scanner 14, instead of being directly and automatically controlled from the receiver 21, is now actuated from a control unit 16 preferably located at the same location as the computer unit 13, and including a manual orientation control 56 which is preferably of a type, such as is shown in Fig. 2 of copending application Ser. No. 444,152, to produce an electrical voltage corresponding to the desired angular rate of change of the scanner 14.

Thus, in the system of Fig. 3, amplifier 23 controlling scanner servo 24 is supplied with its control signal from manual orientation control 56. It will be noted that smoother 22 is no longer used, so that no delay appears between the control 56 and servo 24. The operator actuating the system will operate the control 56 to maintain the scanner 14 pointed toward the target 18, as evidenced by a suitable indicator 57, actuated by radio receiver 21, as described in copending application Ser. No. 441,188, as described therein, indicator 57 may be a cathode ray tube having its beam deflected by the orientation signals from receiver 21 to produce a trace showing the relative displacement between the scanner and the target. The gyro, computer, and gun control portions of the system shown in Fig. 3 are identical with that shown in Fig. 1, and the description given above applies here also.

In this modification, stabilization is produced in the same manner as in Fig. 1. However, this stabilization is no longer required because of the delay introduced by smoother 22, which is omitted in Fig. 3, but in order to make it unnecessary for the operator to compensate for rapid fluctuations in the attitude of the craft, which would necessitate fairly rapid changes in the manual control setting to maintain the target in track with the scanner and the rest of the system. To avoid this, the stabilization correction described with respect to Fig. 1 operates to correct the orientation of the scanner during changes in craft attitude without changing the setting of manual control 56.

Preferably, servo 24 is of the type in which a predetermined signal input derived from amplifier 23 produces a corresponding and preferably proportional angular rate of rotation of its output controlling the scanner orientation, as described in copending application Serial No. 444,152. This is known as a "rate" type of control, since a displacement of the manual control member produces a corresponding angular rate of the controlled device.

During manual tracking operations, it has been found preferable to use what is known as "aided tracking," in which a predetermined displacement of the manual control member produces a proportional displacement of the controlled object and also actuates the controlled object at a rate proportional to the displacement of the manual control member. In order to provide such an aided tracking control in the system of Fig. 3, the signal produced by manual orientation control 56 is passed through a modifying network 58 which comprises a condenser 59 placed in series with a resistor 61 across the input voltage derived from the manual orientation control 56, condenser 59 being bypassed by a resistor 62. Network 58 may also include suitable amplifiers, as desired.

As is described in the above-mentioned application Ser. No. 444,490, and especially with respect to Fig. 5 thereof, if the manual control supplies a voltage proportional to the displacement of the operating member such a circuit produces an output voltage having components proportional to the manual orientation control signal input and the time rate of change or time derivative of this input signal. The component proportional to the control signal when impressed on amplifier 23 and servo 24 will produce an output rate of rotation of servo 24 proportional thereto, in a manner similar to a pure rate control. The remaining derivative component produced by circuit 58 will also produce an output from servo 24 at a rate proportional thereto, which will therefore produce a component of angular displacement of the output of servo 24 proportional to the displacement of the control member of the orientation control 56. In this manner scanner 14 will be controlled by an aided tracking type of control as is desired.

Figure 4:
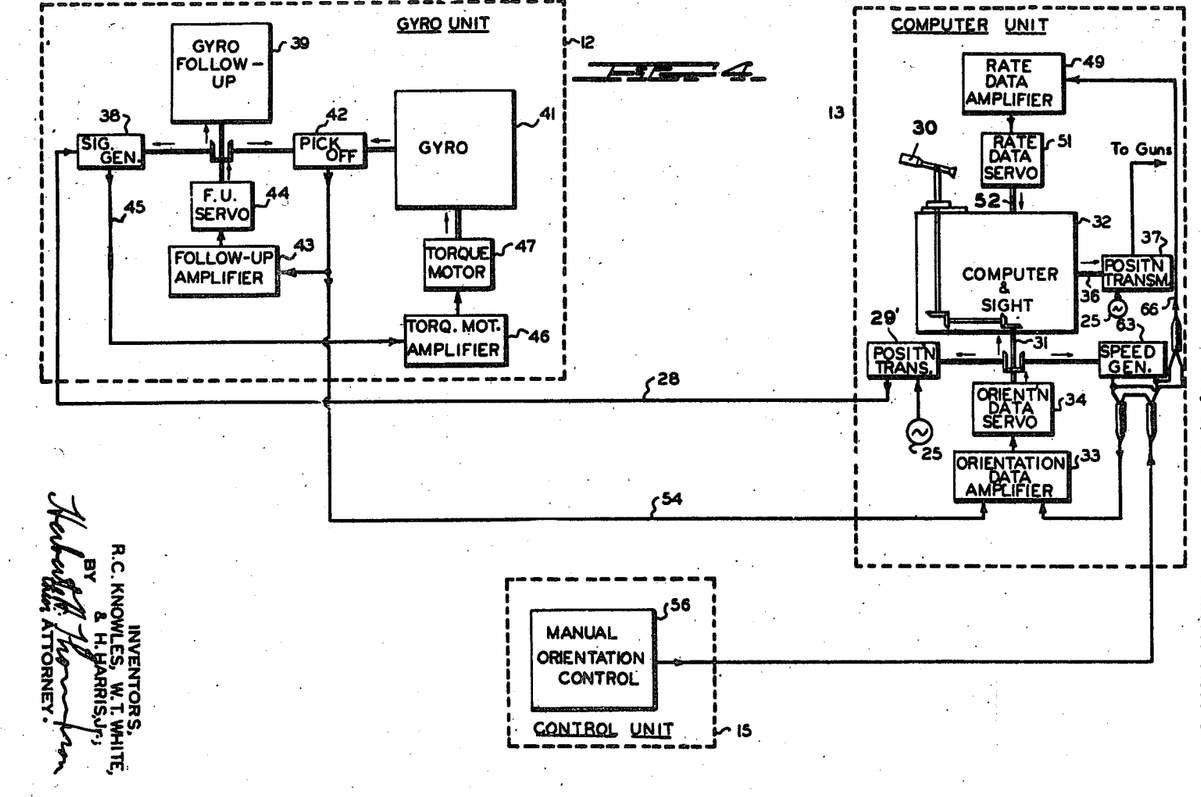
Fig. 4 shows a further schematic block diagram of the system during manually-controlled, visual-tracking and gyro-stabilized operation.

Fig. 4 shows a further modification of the system of the invention in which the scanner 14 is eliminated and in which tracking with the target is performed by means of the optical sight 30 incorporated in the computer 32, as described in copending application 411,186.

In order to produce the proper orientation data input to computer 32 to position sight 30, it will be noted that the orientation data servo 34, controlled in Figs. 1 and 3 from the signal generator 29, must be of the type which will continue to rotate so long as an input is applied thereto from signal generator 29, and may be a simple electric motor.

In order to be able to obtain a rate or aided tracking control system and still use this same servo 34 and the same manual orientation control 56, it is necessary to produce an output angular velocity of servo 34 proportional to the displacement of the manual control 56. This is done in the present system by actuating a so-called "speed generator" 63 from the input shaft 31 of computer 32, which is the output of servo 34. Generator 63 is selected to have the characteristic that its output voltage will be proportional to the speed at which it is rotated, that is, will be proportional to the speed of rotation of input data shaft 31.

If manual control 56 is of the type producing a direct current signal, generator 63 would then be of the similar type, also producing a direct current signal, and may then be a permanent-magnet-type tachometer generator. On the other hand, if manual control 56 is of the type producing an alternating current signal, generator 63 would be of the type producing a corresponding alternating signal of the same frequency and proportional in magnitude to the rate of rotation of shaft 31.

The signals from manual control 56 and generator 63 are connected in series opposition to the amplifier 33, which will thus be actuated by the difference of these two signals. Amplifier 33 is chosen to have a high amplification, whereby servo 34 may be driven at its maximum speed with a relatively small input signal; that is, an input signal which is very small compared to the maximum voltage output of the generator 63 or manual control circuit 56. In this manner, for a predetermined signal input derived from control 56, the servo 34 will be driven at such a speed as will provide a voltage output from generator 63 of the proper value to provide the input signal to amplifier 33 required to maintain the servo at this rotational speed, when opposing the control signal. Since, as described, amplifier 33 requires only a small input signal which may be neglected relative to the manual control and generator signals, it will be seen that the voltage output of generator 63 will be substantially equal and opposite to the voltage derived from manual control 56, and, accordingly, the speed of shaft 31 thereby produced will be proportional to the signal produced by the manual orientation control 56, thus providing a rate control.

Preferably, a modifying circuit similar to 58 of Fig. 3 is interposed between manual control circuit 56 and generator 63 to provide an aided tracking type of control system.

Accordingly, by the apparatus thus far described, computer 32 may be conveniently and readily actuated so as to maintain the line of sight defined by the optical axis of a sight 30 driven from shaft 31 and thereby oriented toward the target. The signal generator 29 of Figs. 1 and 3 is now utilized as a position transmitter indicated by 29' by connecting its singlephase-type winding (if it is of the "selsyn" type) to the source 25 of alternating current instead of deriving a signal therefrom as in Figs. 1 and 3. Accordingly, there will be produced in lead 28 voltages corresponding to the position of input data shaft 31, and hence corresponding to the orientation of the distant target. These voltages are fed to signal generator 38 at the gyro unit 12 and thereby produce in its output 40, a control voltage corresponding to the relative lack of correspondence or relative displacement between the setting of the computer orientation data input 31 and the orientation of the gyro follow-up 39. This control voltage then operates in the same manner as described with respect to Fig. 1 to control the gyro 41 by means of its amplifier 46 and torque motor 47 to produce a signal in pick-off 42 to reposition the gyro follow-up 39 into correspondence with the computer setting, through its amplifier 43 and servo 44.

In this manner, both the gyro 41 and its follow-up 39 are caused to assume the same orientation as that of the optical axis of computer 32, and hence of the target orientation when in track therewith. When the computer optics are accurately tracking with a moving target, gyro 41 will thereby be precessed to also follow the target with its spin axis and, as described above, the signal fed to the torque motor 47 will then correspond to the angular rate of the target. This signal may be fed to amplifier 49 as in Figs. 1 and 3 to control the rate data servo 51 to properly position the rate data input shaft 52 to the computer 32, in the manner described above with respect to preceding figures.

However, a modified rate data control may be used. As just described, the voltage produced by generator 63 is proportional to the rate of change of the data input shaft 31. When the optical axis of the computer 32 is being maintained oriented toward and is tracking with the target, the angular position of orientation data input shaft 31 will accurately represent the orientation of the target. Therefore, the voltage produced by generator 63 will accurately represent the angular velocity of the target, at least along this one coordinate. Accordingly, this generator voltage may be utilized to actuate the rate data servo 51 controlling the rate data input shaft 52, and this is done in the present case by means of the lead 66 connecting the output of generator 63 to the input of amplifier 49. This may be termed a "local rate data control" as distinguished from the remote gyro rate data control of Figs. 1 and 3.

Stabilization correction for computer 32 in Fig. 4 is provided from the signal produced by gyro pick-off 42 over lead 54, in the manner described with respect to Fig. 1.

Accordingly, in this manner, the proper target orientation data and target rate data may be derived by optically tracking with the target. Target range data may be provided by the built-in optical range finding device described in co-pending application 411,186, whereby the system shown in Fig. 4 comprises a stabilized visual-tracking and computer system suitable for controlling the remotely situated guns by way of transmitter 37.

It is to be noted that in each of the systems of Figs. 1, 3 and 4, the same elements are utilized. Accordingly, it is possible and advantageous to provide a system selectively including all of the features thus far described. Such a system is shown in Fig. 5 and includes selective means in the form of a plurality of control or selector switches for producing any of the systems shown and described with respect to Figs. 1, 3 and 4, and for producing other systems not there shown, as will be described.

Figure 5:
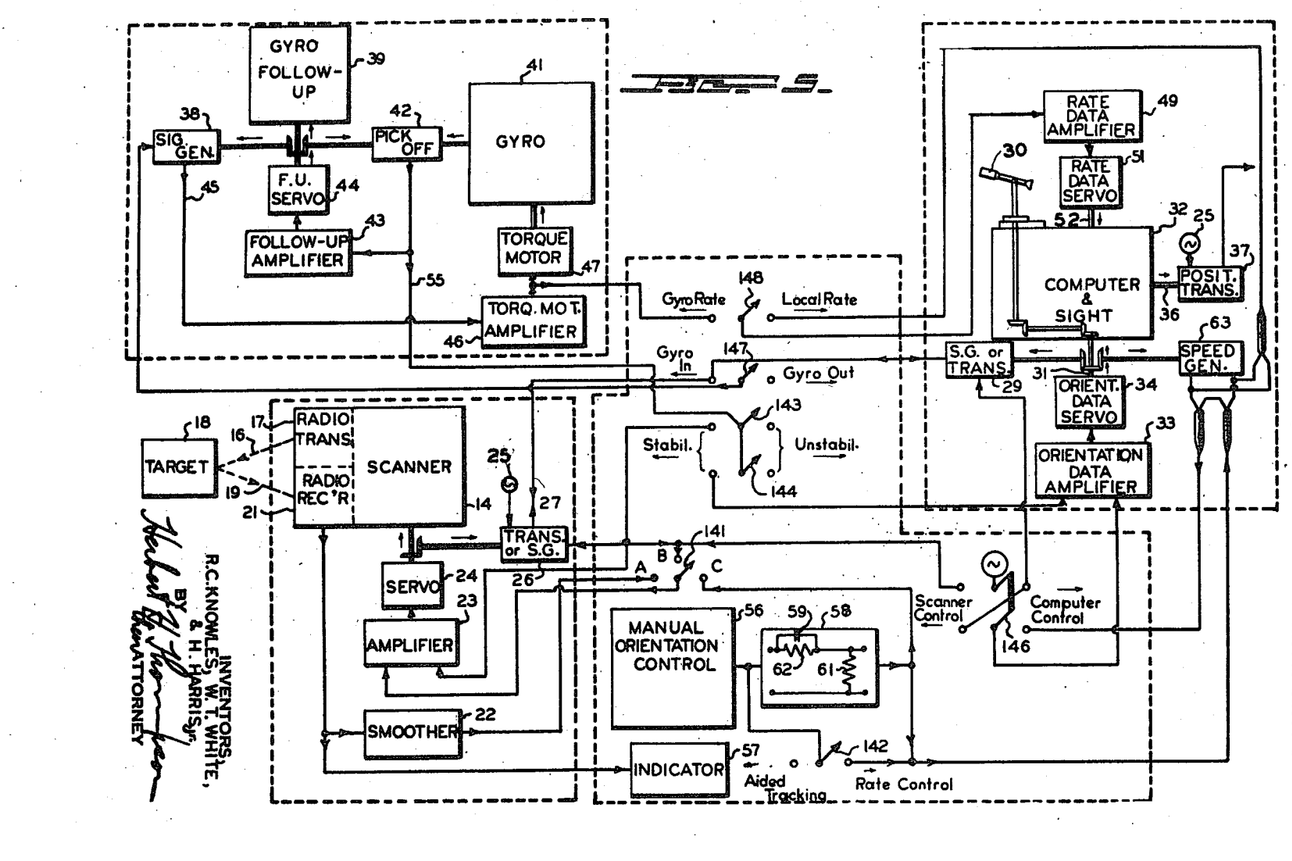
Fig. 5 shows a schematic block diagram of the entire system, wherein the various types of operation shown in Figs. 1, 3 and 4, and others may be obtained by suitable actuation of several selector switches.

Thus, in Fig. 5, a switch 141 is provided for selectively controlling the scanner 14 (1) from the radio receiver 21, (2) from the manual orientation control 56, or (3) from computer 32. It will be seen that in the A position of switch 141, the amplifier 23 controlling the scanner servo 24' is actuated from the output of receiver 21 through smoother 22, as in Fig. 1, producing automatic radio tracking by means of scanner 14 and receiver 21. Indicator 57 in this instance merely serves to monitor or show the effectiveness of the radio control of scanner 14.

In the C position of switch 141, amplifier 23 is controlled by the output of manual control 56, either directly, when switch 142 is in the right position, thereby producing a rate control, or through modifying circuit 58 when switch 142 is in the left position, producing aided tracking control of the scanner 14.

In the center position B, the scanner amplifier 23 is energized from the output of the scanner transmitter 26, now acting as a signal generator fed from computer transmitter 29, in a manner to be described, whereby the scanner 14 now follows and is controlled by the computer 32.

For controlling the stabilization of the scanner 14 and the computer 32, a pair of switches 143 and 144 are provided. In the leftward position of switch 143, the signal derived in the gyro pick-off 42 is fed to the input of scanner servo amplifier 23 to produce a stabilization correction thereof, in the manner described with respect to Figs. 1 and 3. In the rightward position of switch 143, this stabilization correction is disconnected and scanner 14 will act in an unstabilized manner.

Similarly, switch 144, in its leftward position, connects the signal from pick-off 42 and the input to the computer servo amplifier 33 to produce a stabilization correction of the orientation data input to computer 32. In the rightward position of switch 144, this stabilization correction is disconnected. Accordingly, switches 143 and 144 independently select the stabilized or unstabilized condition of scanner 14 and computer 32.

A double-pole double-throw switch 146 is provided for placing either the scanner 14 or computer 32 under the control of the manual orientation control 56. In the leftward or scanner control position of switch 146, the scanner orientation transmitter 26 has its single-phase-type winding connected to source 25 of alternating current and thereby is conditioned to operate as a transmitter. At the same time computer signal generator 29 is connected to the input of amplifier 33 and thereby controls the computer 32 in accordance with the orientation of scanner 14 in the manner described with respect to Fig. 1. Tracking may now be done automatically as in Fig. 1, with switch 141 in the A position and the radio receiver 21 controlling the scanner 14 to track with the the target, or manually as in Fig. 3, with switch 141 in the C position and the manual control 56 actuating the scanner 14 to stay in track with the target as indicated by indicator 57.

In the rightward or computer control position of switch 146, scanner transmitter 26 is deenergized by being disconnected from source 25, and may act as a signal generator. Amplifier 33 is then connected through speed generator 63 to the manual orientation control 56 to produce either manual aided tracking or manual rate tracking of the computer 32, according as switch 142 is thrown to the left or to the right. It will be clear that the orientation data input to computer 32 may be stabilized as before, by throwing switch 144 to the left, or may be unstabilized, if desired, by throwing switch 144 to the right.

With this rightward setting of switch 146, the system is adapted to perform either visual or radio tracking. By utilizing the optical system of the computer, visual tracking may be performed, as in Fig. 4. By connecting switch 141 to position B, whereby scanner signal generator 26 energizes the scanner servo system 23, 24 to follow the setting of the computer 32, tracking may be performed by matching the indications of indicator 57, whereby the scanner is oriented toward the target, and the computer 32, being synchronized with the scanner by virtue of its control thereof, is set in accordance with the target orientation. Thus, if the scanner is available, radio aided or rate tracking may be performed, while if the scanner is disabled or unavailable, visual tracking may be performed.

A further switch 147 is provided for controlling the gyro unit 12. Thus, if switch 147 is in the leftward position the gyro unit signal generator 38 will be energized either from the scanner transmitter 26, if switch 146 is in the left position, or from computer transmitter 29, if switch 146 is in the right position, and accordingly will act to produce the stabilization correction as already described. If switch 147 is in the right position, gyro signal generator 38 is disconnected and the gyro unit is inoperative.

A further selector switch 148 is provided for selectively controlling the rate data input servo 51 of computer 32 either from the gyro signal produced at the input to gyro torque motor 47, as described in Fig. 1, when in the left position, or from the ouput of speed generator 63, as described with respect to Fig. 4, when in the right position.

Preferably switches 148, 143 and 144 are linked to switch 147 so that when switch 147 is in the right position, all switches 143, 144 and 148 must be in the right position, whereas when switch 147 is in the left position, the other switches are free and may be thrown to either position. In this way, by throwing switch 147 to the right, the gyro unit is completely isolated from the rest of the system, as may be necessary if it becomes disabled for any reason.

These seven selector switches 141, 142, 143, 144, 146, 147 and 148 provide a very versatile control for the system of the invention, whereby the system may be utilized with both the gyro unit and the scanner unit, with the gyro unit alone, with the scanner unit alone, or with neither the gyro unit nor the scanner unit, as may be dictated by the circumstances. The following are some of the possible modes of operation of the system.

1. Automatic radio tracking, with or without scanner stabilization, with or without computer stabilization, with gyro-supplied rate data control or with local rate data control (hence with or without the gyro unit).

2. Manual radio tracking, with or without scanner or computer stabilization, with gyro or local rate data control, with aided or rate tracking (hence with or without the gyro unit), with the scanner either controlled directly from the manual control or controlled by the computer.

3. Manual visual tracking, with aided tracking or rate control, with or without computer stabilization, with gyro or local rate data control (hence without the scanner unit and with or without the gyro unit).

It will be seen therefore that the present system takes into consideration most of the circumstances which may affect the operation of the system, and still provides effective operation of the guns for the widest range of possibilities and for maximum defense of the craft. Thus, if either or both the gyro unit or the scanner unit are disabled or rendered unavailable in any way, the system may still operate by means of the computer either alone or with the other portions of the system which are available, to provide most effective control of the guns.

Although the above systems have been described with respect to one coordinate only, it is to be understood that the scanner 14, gyro 41, gyro follow-up 39 and computer 32 are each adapted to be controlled along two independent coordinates. The control system for the second coordinate may be identical with that shown in the above figures for one coordinate, as indicated in Fig. 2, but has been eliminated from the system diagrams of Figs. 1, 3, 4 and 5 for simplicity of description and illustration.

Also, all the servo-controlling amplifiers used herein are preferably provided with suitable anti-hunt and anti-lag devices for assuring accurate and effective operation thereof.

It is to be noted that servo 24 need not be of the rate type, as described above, but may be replaced by a system similar to the servo system of computer 32, including a speed generator such as 63.

Although in the system described above the gyro unit has been shown and described as separated from the scanner, it will be clear that the same stabilization system could be used where the gyro is mounted on the scanner, as shown in application Ser. No. 444,490. With such a modification, the gyro unit would have its follow-up member 104 fixed to the scanner and orientable therewith. The scanner would still be controlled either from the radio receiver or from the manual control through its servo, and the gyro pick-off signal would act in the same way as in the present case to advance the operation of the scanner servo in response to variation in attitude of the craft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A radio gun control system comprising scanner means, including a radio transmitter and a radio receiver, for producing a first signal corresponding to the orientation of a distant target, a manual orientation control for producing a control signal for controlling the orientation of said scanner to track with said target, a computer having an orientation data input and a rate data input and adapted to derive gun aiming angles therefrom, means for producing a signal corresponding to the speed of said orientation data input, means for controlling the orientation of said scanner, a selector for selectively connecting said controlling means to said first signal, said control signal or said orientation data input to track with said target, means for selectively controlling said orientation data input either in response to the orientation of said scanner or by a combination of said control signal and said speed signal, a gyro unit comprising a free gyro, a follow-up member, a pick-off operated by said gyro and said member, and means for controlling said member and said pick-off to maintain said member in correspondence with the orientation of the spin axis of said gyro; means including a torque motor and selectively responsive either to lack of correspondence between said member and said scanner or to lack of correspondence between said member and said computer for actuating said gyro to thereby control said member to reduce said lack of correspondence, means responsive to the output of said pick-off for additionally and individually optionally controlling said computer and said scanner, whereby said computer and scanner are stabilized from said gyro, and means selectively controlling said computer rate data input by said speed signal or the input to said torque motor, whereby said computer is actuated correctly for determining gun aiming angles for intercepting said target by a projectile from said gun.

2. A radio gun control system comprising a radio scanner unit adapted to ascertain the orientation of a target, a gyro unit separated therefrom, a computer unit separated from both said units and having an optical sighting system, means for actuating said computer unit, a selector for selectively controlling said actuating means in accordance with the orientation of said target simultaneously and synchronously with said scanner or in accordance with the orientation of said target as ascertained by said sighting system, means for independently stabilizing said scanner unit and said computer unit from said gyro unit, and means for disengaging said computer unit from either or both said scanner unit and said gyro unit, whereby said computer unit may continue to operate despite disabling of either or both of said scanner or gyro units.

3. A radio gun control system comprising radio scanner means, means for orienting said scanner toward a target, a free gyro, a follow-up member, follow-up means, including a pick-off controlled in accordance with the orientation of said gyro and said follow-up member, for maintaining said member in correspondence with said gyro, means for maintaining said follow-up member in correspondence with said scanner, and including means for producing a signal corresponding to relative displacement between said scanner and said follow-up member, means for producing a torque proportional to said signal and means for precessing said gyro by said signal, whereby said follow-up member is controlled by said gyro and said pick-off to reduce said displacement; means for stabilizing said scanner comprising means for additionally controlling said scanner by said pick-off, a computer having an orientation data input and a rate data input, means for controlling said orientation data input in synchronism with the orientation of said scanner, means for stabilizing said orientation data input, comprising means for additionally controlling said orientation data input by said pick-off, and means for controlling said rate data input from said torque-producing signal, whereby said computer is actuated correctly for gun aiming angles for intercepting said target by a projectile from said gun.

4. Fire control apparatus comprising a computer having a target orientation data input and a target rate data input and adapted to produce therefrom correct gun aiming angles, a sighting device for determining the orientation of a target, a manual control member, means for producing a signal proportional to the displacement of said member, means for producing therefrom a second signal having components proportional to said displacement and the rate of change thereof, means including a servo mechanism for synchronously actuating said orientation data input and said sighting device, a speed generator driven by said mechanism and producing a speed signal proportional to the speed of said orientation data input and of said sighting device, means including an amplifier responsive to small input signals for controlling said servo mechanism at a rate determined by the difference between said second signal and said speed signal, whereby an aided tracking control of said sighting device and orientation data input is obtained, and means for controlling said rate data input by said speed signal.

5. Fire control apparatus comprising a computer having a target orientation data input and a target rate data input and adapted to produce therefrom correct gun aiming angles, a manual control member, means for producing a signal having components corresponding to the displacement and to the rate of change of displacement of said control member, means including a servo mechanism for actuating said orientation data input, a speed generator driven by said mechanism synchronously with said orientation data input and producing a speed signal corresponding to the speed of said orientation data input, means for controlling said servo mechanism by the difference between said first signal and said speed signal, whereby an aided tracking control of said orientation data input is obtained, and means for controlling said rate data input by said speed signal.

6. Fire control apparatus comprising a computer having a target rate data input and a target orientation data input and adapted to produce therefrom correct gun aiming angles, means for actuating said orientation data input in correspondence with the orientation of a distant target, a speed generator driven from said orientation data input and adapted to produce an electrical signal corresponding to the rate of change of position of said orientation data input, and means for actuating said rate data input by said signal, whereby, when said orientation data input is in correspondence with said target, true target rate data is set into said rate data input.

7. Tracking control apparatus of the aided tracking type comprising an output member, a control member, means for producing a signal proportional to the displacement of said control member, means for producing therefrom a second signal having components proportional to said displacement and to the rate of change of said displacement, servo means adapted to produce a rotation of said output member responsive to a small input signal, a speed generator driven by the output of said servo means synchronously with said output member and producing a speed signal proportional to its rate of rotation, and means for controlling said servo input by the difference between said second signal and said speed signal.

8. Tracking control apparatus of the aided tracking type comprising an output member, a control member, means for producing a signal having components corresponding to the displacement and to the rate of change of displacement of said control member, servo means for producing rotation of said output member, a speed generator driven by the output of said servo means synchronously with said output member and producing a speed signal corresponding to its rate of rotation, and means for controlling the input to said servo means by the difference between said first signal and said speed signal.

9. Tracking control apparatus of the aided tracking type comprising an output member, a control member, means for producing a signal having components corresponding to the displacement and to the rate of change of displacement of said control member, servo means adapted to produce an output rate of rotation corresponding to an input signal, and means for controlling said servo means by said first signal.

10. Fire control apparatus for moving craft comprising means for ascertaining the orientation of a distant target, a gyro unit comprising a free gyro, a follow-up member and means including a pick-off for maintaining said member in correspondence with said gyro; means for maintaining said member in correspondence with said orientation ascertaining means, a computing mechanism having an orientation data input, means for controlling said input in correspondence with said orientation ascertaining means, and means for compensating said input for rapid fluctuations in the attitude of said craft, comprising means for additionally controlling said input by said pick-off.

11. Apparatus for stabilizing an orientable member comprising a free gyro, a follow-up member therefor, a pick-off operated by said gyro and by said follow-up member to produce a signal corresponding to relative displacement therebetween, means for actuating said follow-up member by said signal to reduce said displacement, means responsive to lack of correspondence between said follow-up member and said orientable member producing a second signal, means responsive to said second signal for applying a torque to said gyro, whereby said gyro is precessed and said follow-up member is thereby controlled to reduce said lack of correspondence, and means for controlling said orientable member in accordance with said pick-off signal, whereby said orientable member is stabilized.

12. Apparatus for stabilizing an orientable member comprising a free gyro, a follow-up member therefor, means including a pick-off for maintaining said follow-up member in correspondence with said gyro, means for controlling said gyro to maintain said follow-up member in correspondence with said orientable member, and means for controlling said orientable member by said pick-off, whereby said orientable member is stabilized by said gyro.

13. Apparatus for stabilizing an orientable member comprising a free gyro, a follow-up member therefor, a pick-off operated by said gyro and by said follow-up member to produce a signal corresponding to relative displacement therebetween, means for actuating said follow-up member by said signal to reduce said displacement, means responsive to lack of correspondence between said follow-up member and said orientable member producing a second signal, means responsive to said second signal for applying a torque to said gyro, whereby said gyro is precessed and said follow-up member is thereby controlled to reduce said lack of correspondence, means for controlling said orientable member in accordance with said pick-off signal, whereby said orientable member is stabilized, and means actuated by said second signal for supplying data corresponding to the velocity of said orientable member.

RICHARD C. KNOWLES.
WALTER T. WHITE.
HERBERT HARRIS, Jr.